May 31, 1932.  H. RUSBY  1,860,552

COUPLING FOR SHAFTS

Filed Aug. 30, 1929    2 Sheets-Sheet 1

INVENTOR
*Hermann Rusby.*
BY
*Wesley J. Carr*
ATTORNEY

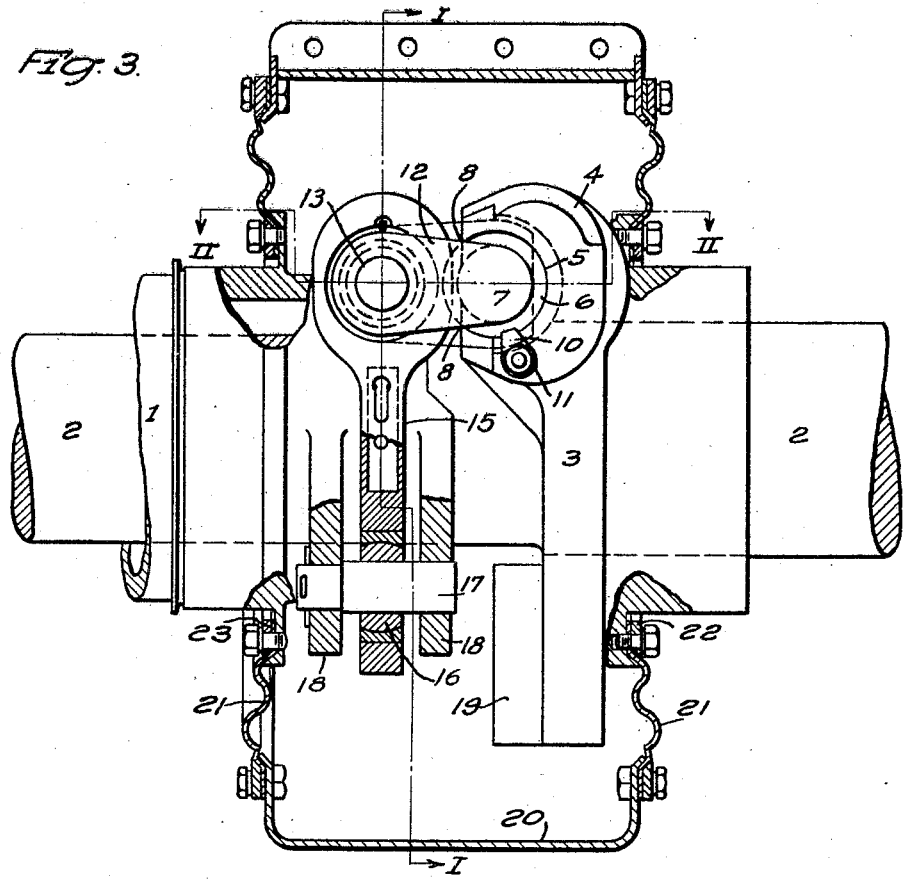

Patented May 31, 1932

1,860,552

UNITED STATES PATENT OFFICE

HERMANN RUSBY, OF STOCKSBRIDGE, NEAR SHEFFIELD, ENGLAND, ASSIGNOR TO WESTINGHOUSE ELECTRIC & MANUFACTURING COMPANY, A CORPORATION OF PENNSYLVANIA

COUPLING FOR SHAFTS

Application filed August 30, 1929, Serial No. 389,398, and in Great Britain September 21, 1928.

My invention relates to couplings for shafts or other rotary members which, in normal operation, are disposed in substantially co-axial relation and provide means for permitting lateral displacements of the shafts or members in a plane perpendicular to the normal axis of rotation and also for limited relative longitudinal displacements.

In United States Patent 1,633,935, to George H. Fletcher and Herman Rusby, issued June 28, 1927, and assigned to the Westinghouse Electric and Manufacturing Company, is described an improved form of coupling for connecting rotary members comprising a pair of links connected by universal joints, at one end, to one of the members of the coupling and, at the other end, to cranks on a shaft which is disposed in a transverse plane of, and journaled on, the other member to be coupled.

My present invention provides a coupling of an improved type wherein the transverse shaft is provided with pairs of crank members or arms which support between them the spherical joints through which connection is made, by means of links, to the other member to be coupled.

In order that the forces, which are exerted on the mechanism, when in operation, may be distributed in an advantageous manner, the journal bearings for the transverse shaft are disposed between each of the pairs of cranks or arms. The forces exerted between the coupled members are transmitted through the pairs of arms and are taken up at the shaft bearings without introducing bending moments within the shaft and, consequently, the parts may be of light construction.

Preferably, the coupling is enclosed in a dust-proof casing which is connected to flanges on the members to be coupled, and suitable means are provided for supplying lubricating oil to the wearing surfaces.

An object of the invention is to provide a coupling for rotary members which will permit relative motion between the members to be coupled in all directions except angularly to the plane of rotation.

Another object of the invention is to provide a coupling mechanism which is of simple and rugged construction and in which the forces are transmitted from the one to the other member in such manner that excessive bending moments are avoided.

Figure 1:
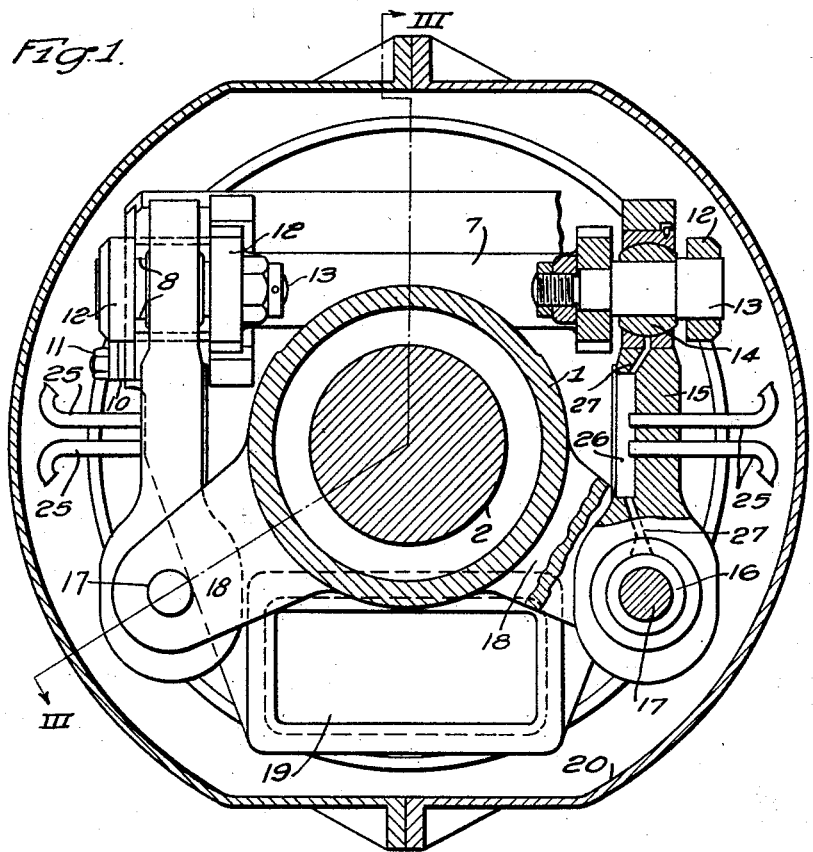

Although capable of general application, my invention is particularly adapted for transmitting torque from a motor-driven quill shaft of a locomotive to a driving-wheel axle. The foregoing objects of my invention may be achieved by means of the mechanism more particularly described in the following specification, together with other objects which will be apparent upon studying the description in connection with the accompanying drawings, wherein, Figure 1 is a view, in cross section, of the coupling mechanism taken on the line I—I of Fig. 3, a portion of the connecting line being broken away to better illustrate its construction, Fig. 2 is a plan view of the coupling, showing the transverse shaft and the member on which it is mounted partly in section, the section being taken on the line II—II of Fig. 3, Fig. 3 is a view, in side elevation, of the coupling, the outer casing being shown in section, taken on the line III—III of the Fig. 1.

As shown in the drawing, the coupling is suitable for use on an electric locomotive for coupling a hollow driving shaft or quill shaft 1 to a driving-wheel axle 2, which is disposed co-axially with, and extends through, the quill shaft. The part of the coupling which is secured to the axle 2 comprises a flange or collar 3 of approximately rectangular shape having, on one side, two enlarged portions 4 that are provided with openings 5 for receiving bearing bushings 6 which are adapted for journaling a transverse shaft 7 in such manner that it lies in a plane at right angles to the axis of the axle 2, and, as nearly as possible, to the axle 2 without actually bearing upon it. Each of the openings 5 is provided with a slot 8 of such width as to permit journal portions 9, of the shaft 7, to be passed through them when assembling the mechanism.

As shown, each of the bearing bushings 6 is formed in two halves, one of which may be inserted end-wise into the openings 5 back of the shaft 7 and rotated through an angle of about 180° to close the slot 8 and to make room for the insertion of the second half of the bushing, thereby completely enclosing the journal portions 9. The bushings 6 may then be rotated through an angle of about 90° to their final positions and secured against further rotation by the insertion of keys 10, which are provided with locking means 11.

Figure 2:
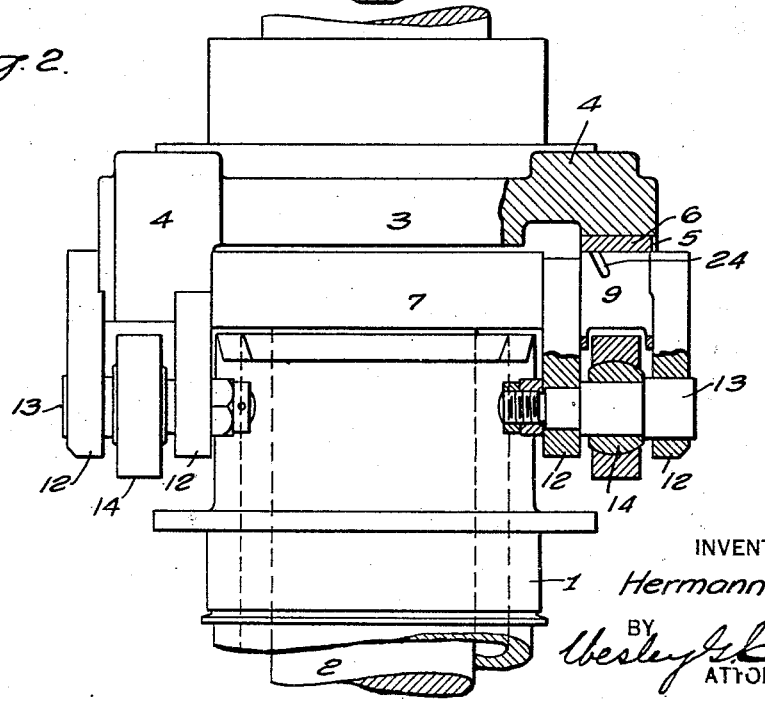

As best shown in Fig. 2, the transverse shaft 7 is provided, at each end, with a pair of crank members or arms 12 which are disposed in such manner that a journal portion 9 lies between the arms of each pair. In order that the transverse shaft 7 and the arms 12 may oscillate through an angle when the coupling is in service, the enlarged portions 4 are so shaped as to permit the necessary movement. Each pair of arms 12 on the transverse shaft 7 supports, near its end, a pin 13 which is disposed parallel to the shaft 7 and carries, between the arms 12, a spherical bearing member 14.

As shown in Fig. 1, the portion of the coupling which is carried by the quill shaft comprises two pairs of crank members or arms 18 which extend radially from the quill shaft.

As best seen in Fig. 1, each pair of arms 18 on the quill shaft 1 supports a pin 17 which carries, between the arms 18, another spherical bearing member 16 similar to the bearing member 14 carried by the pin 13 on the transverse shaft 7. In order to transmit torque from the quill shaft 1 to the wheel axle 2, the spherical portions 16 and 14 on the arms 18 and the arms 12, respectively, engage correspondingly shaped bearings at the ends of a pair of links 15.

As described hereinbefore, it is evident that the coupling will permit limited relative movement between the two coupled members 1 and 2 in all directions other than rotation about their longitudinal axes and will effectively transmit torque from one member to the other, while permitting misalignment or relative tilting movement of the members to take place freely.

By reason of the disposition of the crank arms 12 on each side of the transverse-shaft journals 9, and the attachment of the connecting links 15 in a transverse plane of the journals, the forces are more directly transmitted between the members 1 and 2, and bending moments in the shaft 7 are reduced to a minimum, thereby enhancing the reliability and durability of the mechanism.

The transverse-shaft bearings 6 are lubricated by means of grooves 24 in the journals 9 into which oil is thrown by centrifugal force when the coupling is in service. The bearings 14 at the ends of the links 15 are supplied with oil by means of the tubes 25, carried by the links and disposed to pick up oil at such times as the coupling may be rotated at slow speeds and conducted to cavities 26 provided in the links, from which cavities the oil may flow by centrifugal force through ducts 27 leading to the surface of the spherical bearings 14 and 16 at the ends of the links 15. As shown in Fig. 1, a tube 25 is provided for each direction of rotation.

On the side of the coupling, diametrically opposite to the transverse shaft 7, the flange 3 is provided with a counter-weight 19 which is disposed to substantially balance the unbalanced mass of the transverse shaft 7 and its bearings and to ensure substantially balanced operation of the mechanism.

The coupling is enclosed by a muff-like member 20 constituting an oil-bath and dust-proof casing and resiliently supported, at each end, by spring members 21 which are connected by flanges 22 and 23 on the axle and on the hollow shaft, respectively.

Although I have described a specific embodiment of my invention, it will be apparent to those skilled in the art that various modifications may be made in the details of the construction and in the arrangement of the several cooperating parts without departing from the spirit and scope of my invention as defined in the appended claims.

I claim as my invention:

1. In a device for coupling rotatable elements, in combination, a shaft carried by one of the elements and disposed in a plane transverse thereto, a plurality of bearings on said element for journaling the shaft, a pair of crank arms on the shaft disposed with a bearing between the arms of each pair, a plurality of pairs of crank arms carried by the other element to be coupled, spherical bearing members carried by, and disposed between, the arms of each pair of crank arms, and link members for connecting the spherical bearing portions and carried by the elements to be coupled.

2. A shaft coupling comprising a driving and a driven member, a shaft journalled in the driven member transversely to the axis thereof, a plurality of crank arms on said shaft, links connected by universal joints to said crank arms and to the driving member, cavities in the links for receiving oil, ducts leading from the cavities to bearing surfaces whereby oil may be supplied to the surfaces by centrifugal force, a casing for the coupling and means for conveying oil from the casing to the cavities in the links while the coupling is rotating.

In testimony whereof, I have hereunto subscribed my name this twelfth day of August, 1929.

HERMANN RUSBY.